United States Patent [19]
Kato et al.

[11] 4,313,529
[45] Feb. 2, 1982

[54] HYDRAULIC DAMPER

[75] Inventors: Tetuo Kato, Yokohama; Tamio Uemura; Yoshiki Kodama, both of Kawasaki, all of Japan

[73] Assignee: Tokico Ltd., Kawasaka, Japan

[21] Appl. No.: 91,495

[22] Filed: Nov. 5, 1979

[30] Foreign Application Priority Data

Nov. 10, 1978 [JP] Japan ................. 53-138600

[51] Int. Cl.³ .................................... F16F 9/46
[52] U.S. Cl. .................. 188/299; 188/319; 251/131; 251/207; 251/326; 280/714
[58] Field of Search ............ 188/299, 300, 319; 280/714; 251/131, 207, 326

[56] References Cited

U.S. PATENT DOCUMENTS

| | | | |
|---|---|---|---|
| 1,925,086 | 9/1933 | Snyder | 251/207 X |
| 1,962,676 | 6/1934 | Albright | 251/131 X |
| 2,453,855 | 11/1948 | Oliver | 188/300 |
| 3,125,186 | 3/1964 | Day | 188/299 |
| 3,307,824 | 3/1967 | Weisheit | 251/131 |
| 3,559,776 | 2/1971 | Schultze | 188/299 |
| 3,752,189 | 8/1973 | Marr | 251/131 X |

FOREIGN PATENT DOCUMENTS 462424 3/1951 Italy .................. 188/319

Primary Examiner—George E. A. Halvosa
Attorney, Agent, or Firm—Wenderoth, Lind & Ponack

[57] ABSTRACT

A hydraulic damper is provided with a damping force adjusting mechanism. The damper includes a piston slidably positioned with a closed ended cylinder which functions to divide the interior of the cylinder into two chambers. Communication between the two chambers is provided by passageways partially defined by apertures and bores within the piston. Fluid flow between the two chambers via the passageways serves as the damping force. The damping force is made adjustable by a rotary valve positioned within one of the passageways which functions to vary the effective cross-sectional area of that passageway thus functioning as a damping force adjusting element. A device is provided to vary the damping force adjusting mechanism from the exterior of the hydraulic damper in accordance with a predetermined damping force.

7 Claims, 6 Drawing Figures

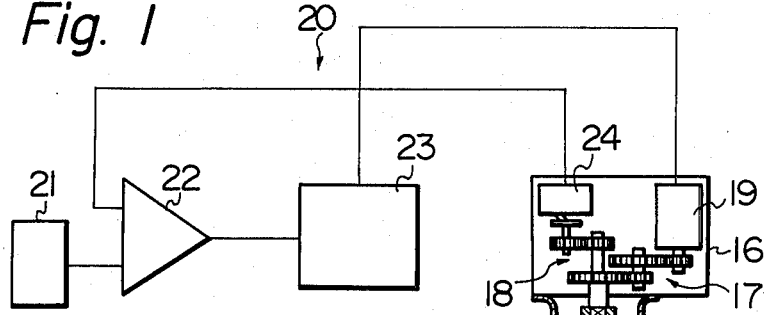
Fig. 1
Fig. 2
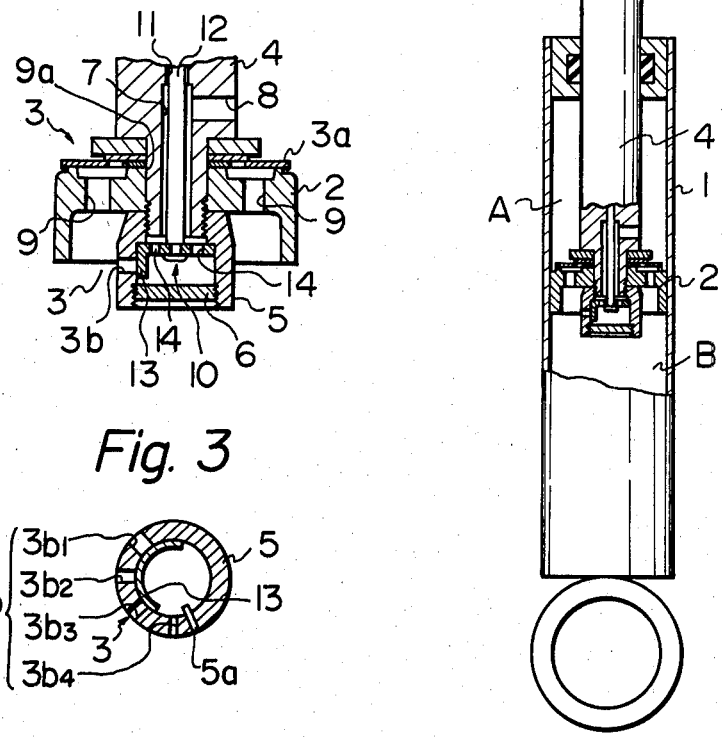
Fig. 3
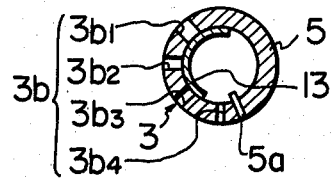

HYDRAULIC DAMPER

BACKGROUND OF THE INVENTION

This invention relates to a hydraulic damper and more particularly to improvements in hydraulic dampers of the type comprising a cylinder containing therein hydraulic fluid, a piston working in the cylinder and dividing the interior thereof into two chambers, a piston rod secured to the piston and extending to the outside of the damper, and a damping force adjusting device operable from the outside of the damper to change or adjust the damping force of the damper.

In one of the prior art hydraulic dampers of this type, the damping force adjusting mechanism is mounted on the side wall of the damper. The damper works satisfactorily, however, the construction of the damper is complicated, and due to its size the damper cannot be installed in a restricted space.

Another prior art hydraulic damper of this type comprises a hollow piston rod having a rod member extending co-axially therethrough, and a valve body connected to the inner end of the rod member. By actuating the rod member from the outside, the damping force is adjusted by changing the effective area of a passage connecting the both chambers. An actuating mechanism such as an operating knob or the like is installed on the upper end of the damper, however, there are shortcomings in that the adjustment cannot be effected easily and that the dust, water or the like will accumulate on the mechanism thus limiting the durability of the damper. Further, it has been difficult to effectively adjust the passage area based only on known parametric conditions outside of the damper.

SUMMARY OF THE INVENTION

An object of the present invention is to provide a hydraulic damper eliminating the shortcomings described above. This is achieved by a hydraulic damper according to the present invention which comprises a cylinder receiving therein hydraulic fluid, a piston working in the cylinder and dividing the interior of the cylinder into two chambers, a damping force generating mechanism provided on the piston, a piston rod secured to the piston, an adjusting member with a head portion being connected to the damping force generating mechanism for adjusting the damping force in the generating mechanism and a stem portion extending through the piston rod which outwardly projects from the damper, an electric motor connected to the adjusting member, and control means for controlling the motor.

Preferably, the damping force generating mechanism comprises a fixed orifice cooperating with the adjusting member, and a disc valve cooperating with an aperature which extends through the working piston.

BRIEF DESCRIPTION OF THE DRAWINGS

The present invention will now be further described, by way of example, with reference to the accompanying drawings, in which:

FIG. 1 is a partially sectional and partially schematic view of a hydraulic damper according to the invention;

FIG. 2 is an enlarged view of the essential portion of FIG. 1;

FIG. 3 is a cross-sectional view of a portion of FIG. 2;

Figure 4:
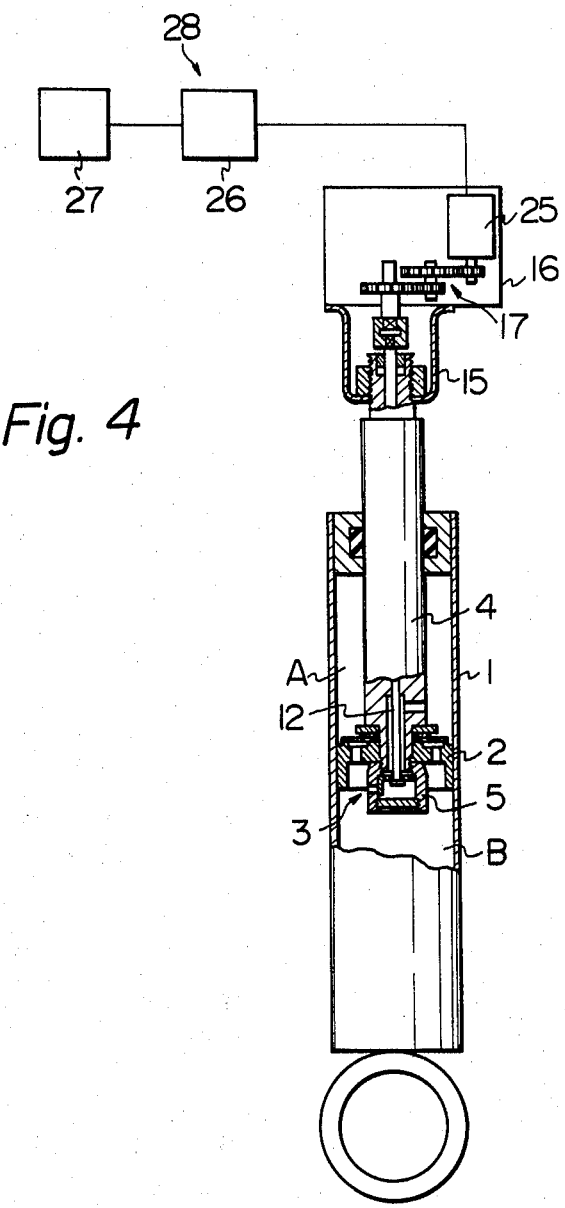
FIG. 4 is a view similar to FIG. 1 but showing a second embodiment of the invention.

DETAILED DESCRIPTION OF THE PREFERRED EMBODIMENTS:

The hydraulic damper shown in FIGS. 1, 2 and 3 comprises a cylinder 1 one end, the upper end in the embodiments, of which is closed by a rod guide and a seal ring. In the interior of the cylinder 1 there are oil and gas which are separated by a free piston (not shown). A piston 2 slides in the cylinder 1 and divides the interior thereof into two oil chambers A and B. A damping force generating mechanism 3 is mounted on the piston 2 with an aperture 9 therethrough, and the mechanism 3 which consists of a disc valve $3a$ mounted in the aperture 9 on the upper side of the piston 2 and a fixed orifice $3b$ mounted on the lower side of the piston 2.

A hollow piston rod 4 is secured to the piston 2 and extends through the oil chamber A to the outside of the cylinder 1, and has an axial bore 11 throughout its axial length. The lower portion of the bore 11 is counterbored to form a large diameter portion which acts as a passage 7. The lower end of the piston rod 4 is fitted to the piston 2 and is secured to the piston 2 by means of a sleeve nut or tubular member 5 threadingly engaged through a bore $9a$ in the piston 2 with the piston rod 4. A fixed orifice $3b$ consists of a plurality of small holes $3b_1$, $3b_2$, $3b_3$ and $3b_4$ formed on the circumferential wall of the sleeve nut 5. The lower end of the sleeve nut 5 is closed by a cap 6, and the fixed orifice $3b$ places the oil chamber B in communication with the oil chamber A through the interior of the sleeve nut 5, a passage 7 and a transverse passage 8. The transverse passage 8 is formed as a radial bore through the piston rod 4 to connect the upper end of the passage 7 with the oil chamber A.

An adjusting member 10 has a stem portion 12 and a head portion 13 which is a rotary valve and which cooperates with the fixed orifice $3b$. The stem portion 12 sealably extends through the axial bore 11 and through the large diameter portion (the passage 7), and the upper end projects out of the piston rod 4, and the lower end is secured to the head portion 13. The head portion 13 has a generally cup-shaped configuration having a half cylindrical or arcuate sidewall being as shown in FIGS. 2 and 3. The cylindrical sidewall slidingly engages the inner cylindrical surface of the sleeve nut 5 and cooperates with the orifice $3b$. A plurality of openings 14 are formed in an annular surface or bottom portion of the cup which communicates the interior of the sleeve nut 5 with the passage 7.

A pin $5a$ (FIG. 3) acting as a stop is mounted on the sleeve nut 5 and is engageable with either of the circumferential end surfaces of the head portion 13 to limit its rotational movement. The range of the rotational movement of the adjusting member 10 with respect to the sleeve nut 5 is restricted to an angle of about 180 degrees. When one of the circumferential or arcuate end surfaces engages the stop $5a$ all of the holes $3b_1$, $3b_2$, $3b_3$, and $3b_4$ are closed by the head portion 13 and the cross sectional area of the orifice $3b$ is reduced to the minimum, and when the adjusting member 10 is rotated in the clockwise direction, as viewed in FIG. 3, the holes $3b_4$, $3b_3$, $3b_2$ and $3b_1$ will sequentially open, and the effective cross sectional area of the orifice $3b$ will gradually increase.

A supporting frame 15 is mounted on the upper end of the piston rod 4 for supporting thereon a casing 16. Two gear trains 17 and 18 are mechanically connected to the upper end of the stem porton 12 of the adjusting member 10 and are housed within the casing 16. An electric motor 19 is connected to the stem portion 12 through the gear train 17, and a potentiometer 24 is connected to the gear train 18.

The motor 19 is connected with a motor actuating device 23, and the motor actuating device 23 and the potentiometer 24 are connected to a comparator 22, and the comparator 22 is also connected to an angle setting device 21. The motor 19, the angle setting device 21, the comparator 22, the motor actuating device 23, the potentiometer 24 and gear trains 17 and 18 constitute control means 20 according to the present invention.

In operation, the angle setting device is firstly set at zero, the motor 19 rotates the adjusting member 10 in the counterclockwise direction as viewed in FIG. 3 to fully close the fixed orifice $3b$. Then, a desired angle is set by operating the angle setting device 21. The comparator receives signals from the angle setting device 21 and the potentiometer 19, and the comparator supplies the signal corresponding to the difference therebetween to the motor actuating device 23. The motor 19 rotates the adjusting member 10 by the necessary amount so that the desired angle of the rotary valve is achieved. At this desired angle, the output signal of the potentiometer 24 is equal to the signal from the angle setting device 21, thus, the output signal of the comparator 22 becomes zero and the motor actuating device 23 stops the rotation of the motor 19. The fixed orifice $3b$ cooperates with the disc valve $3a$ in the aperture 9 to generate the desired damping force in operating the damper.

FIG. 4 shows a second embodiment of the present invention in which the main body portion of the damper is similar to the first embodiment and the same numerals have been applied to the corresponding parts.

In the embodiment, a pulse motor 25 is connected through a gear train 17 to the adjusting member 10. The pulse motor 25 is connected to a pulse generator 26 which, in turn, is connected with a pulse number setting device 27. The pulse number setting device 27, the pulse generator 26, the pulse motor 22 and the gear train 17 constitute control means 28 according to this embodiment of the present invention.

The pulse generating device 26 receives a signal from the pulse number setting device 27 and supplies pulses to the pulse motor 25, the number of pulses being set by the signal. The motor 25 rotates the adjusting member 10 by an angle corresponding to the number of pulses supplied from the pulse generator 26.

Figure 5:
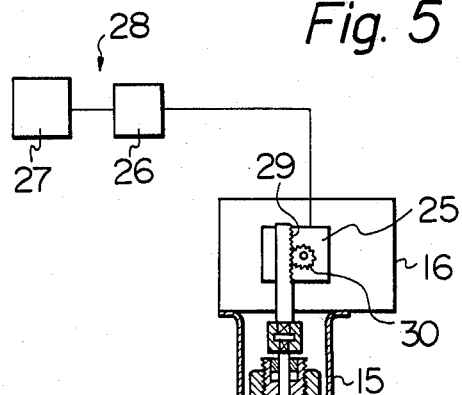
FIG. 5 is a view similar to FIG. 1 but showing a third embodiment of the invention.
Figure 6:
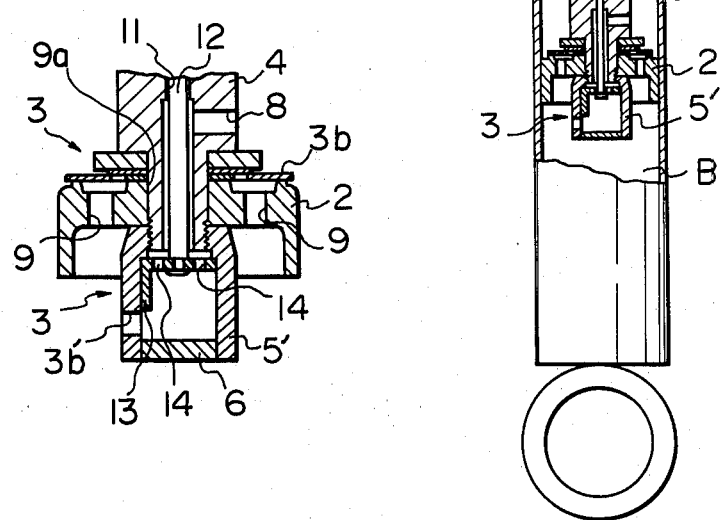
FIG. 6 is an enlarged view of the essential portion of FIG. 5.

FIGS. 5 and 6 show a third embodiment of the invention and same numerals have been applied to parts corresponding to the first and second embodiments.

The sleeve nut 5 in the first embodiment is modified to a sleeve nut or tubular member 5', the axial length of which is longer than the nut 5. In the side wall of the nut 5' there is formed a single radial opening $3b'$ constituting the fixed orifice of the invention. The adjusting member is movable in the vertical direction, and when the head portion or valve 13 of the adjusting member 10 moves downward from the position shown in FIG. 6 the effective cross-sectional area of the fixed orifice $3b'$ gradually decreases.

There are rack teeth 29 formed in the upper end of the stem portion 12 of the adjusting member, and a pinion gear 30, engaged with rack teeth 29, is connected to the pulse motor 25. Thus, when the pulse motor 25 is rotated in response to the pulse generating device 26 which is controlled by the pulse number setting device 27, the adjusting member moves downward through the pinion 30 and rack teeth 29, whereby the effective area of the fixed orifice $3b'$ changes and thereby changes the damping force.

According to the invention, the motor 19 or 25 and relating parts such as gear trains or the like are enclosed in the casing 16, thus it is possible to protect these parts from dusts, water or the like. The angle setting device 21 or the pulse number setting device 27 can be installed at the position being accessible to a driver of a vehicle, thus, adjustment of the damping force can be effected even when the vehicle is running.

It will be noted that the invention is not limited to the embodiments illustrated and described, and various changes or modifications within the gist of the invention can easily be applied by those skilled in the art. For example, the motor may be substituted by a linear motor, the damper is not limited to the single tube type, and the invention can easily be applied to a dual tube type.

What is claimed is:

1. A hydraulic damper comprising:
    a cylinder having opposite closed ends for containing hydraulic fluid.
    a piston having two sides and a bore therethrough, said piston being positioned within the interior of said cylinder and being slidable in the direction of the longitudinal axis of said cylinder, the interior of said cylinder being divided into two chambers by said piston;
    a tubular member connected to a first one of said piston sides;
    a hollow piston rod connected to said piston on the second one of said piston sides, the interior of said hollow piston rod communicating with the interior of said tubular member through said piston bore;
    said tubular member having at least one orifice through the cylindrical surface thereof whereby the interior of said tubular member communicates with the chamber on said first one of said piston sides;
    a communicating means which communicates the interior of said hollow piston rod with the chamber on the second one of said piston sides;
    a rotary valve rotatably and slidably positioned in the interior of said tubular member for selectively communicating said two chambers, said rotary valve having:
        an annular surface having an opening therethrough and being rotatably and slidably positioned relative to said tubular member; and
        an arcuate sidewall connected to a peripheral edge of said annular surface, said sidewall rotatably and slidably engaging the inner periphery of the cylindrical surface of said tubular member, and said sidewall being semi-circular shaped whereby when said valve is rotated in one direction said sidewall sequentially covers a portion or all of said orifice and thereby limits the communication between said two chambers, and when said valve is rotated in the other direction said sidewall sequentially uncovers a portion or all of said orifice and thereby expands the communication between said two chambers;

an elongated stem extended through the interior of said hollow piston rod and being fixedly connected to said valve, a portion of said stem extending outwardly from one of said cylinder ends;

a motor with a rotating element connected to said outwardly extending stem portion for rotating said stem and thereby rotating said valve, and a control means connected to said motor and which controls a motor rotating element and thereby controls the selective communicating between said two chambers.

2. A hydraulic damper as claimed in claim 1, in which:

said piston has an aperture therethrough and a valve positioned in said aperture for allowing one way communication between said two chambers.

3. A hydraulic damper as claimed in claim 1, wherein the cylindrical surface of said tubular member has a plurality of orifices therethrough, said orifices being positioned whereby rotation of said valve sequentially covers or uncovers a portion or all of said orifices.

4. A hydraulic damper as claimed in claim 1, wherein said motor is a pulse motor.

5. A hydraulic damper as claimed in claim 4, wherein said control means comprises a pulse number setting device and a pulse generator connected to said pulse number setting device.

6. A hydraulic damper as claimed in claim 1, said control means comprising:

an angle setting device for setting an angle of rotation of said rotary valve, said angle setting device generating an output signal;

a potentiometer connected to said stem for measuring an angle of rotation of said rotary valve, said potentiometer generating an output signal;

a comparator connected to said angle setting device and said potentiometer for receiving output signals therefrom and generating an output signal; and a motor actuating device connected to said comparator for receiving an output signal therefrom and connected to said motor for controlling the rotation of a motor element connected to said stem and thereby controlling the angle of rotation of said rotary valve.

7. A hydraulic damper as claimed in claim 1, wherein the maximum angle of rotation of said rotary valve is substantially 180 degrees.

* * * * *